US012580329B2

(12) United States Patent
Sundarakrishnamachari et al.

(10) Patent No.: US 12,580,329 B2
(45) Date of Patent: Mar. 17, 2026

(54) ELECTRICAL CONNECTOR ASSEMBLY AND METHOD OF ASSEMBLING SAME

(71) Applicant: Aptiv Technologies AG, Schaffhausen (CH)

(72) Inventors: Rangarajan Sundarakrishnamachari, Chennai (IN); Siddhan Manickam, Salem (IN); Dineshkumar Manoharan, Chennai (IN); Dale Smutny, Canfield, OH (US)

(73) Assignee: Aptiv Technologies AG, Schaffhausen (CH)

( * ) Notice: Subject to any disclaimer, the term of this patent is extended or adjusted under 35 U.S.C. 154(b) by 588 days.

(21) Appl. No.: 17/992,080

(22) Filed: Nov. 22, 2022

(65) Prior Publication Data

US 2024/0170863 A1 May 23, 2024

(51) Int. Cl.
*H01R 9/05* (2006.01)
*H01R 13/508* (2006.01)
*H01R 13/639* (2006.01)

(52) U.S. Cl.
CPC ............ *H01R 9/05* (2013.01); *H01R 13/508* (2013.01); *H01R 13/639* (2013.01)

(58) Field of Classification Search
None
See application file for complete search history.

(56) References Cited

U.S. PATENT DOCUMENTS

| | | | | |
|---|---|---|---|---|
| 9,667,000 | B1 | 5/2017 | Morello et al. | |
| 9,960,550 | B2 | 5/2018 | Ensley et al. | |
| 10,680,380 | B2 | 6/2020 | Penn et al. | |
| 10,886,668 | B1 | 1/2021 | Morello et al. | |
| 2015/0311602 | A1* | 10/2015 | Duesterhoeft | H01R 13/6593 439/817 |
| 2017/0310062 | A1* | 10/2017 | Eriksen | H01R 24/542 |
| 2018/0026408 | A1* | 1/2018 | Ensley | H01R 24/38 439/578 |
| 2018/0034172 | A1* | 2/2018 | Singhammer | H01R 43/20 |
| 2021/0098930 | A1 | 4/2021 | Aleman et al. | |
| 2022/0069518 | A1* | 3/2022 | Kugler | H01R 24/545 |

* cited by examiner

*Primary Examiner* — Oscar C Jimenez
(74) *Attorney, Agent, or Firm* — Billion & Armitage

(57) ABSTRACT

An electrical connector assembly includes an electrical terminal having an attachment segment connected to an electrical cable and a separate connection segment configured to mate with a corresponding mating terminal and a connector housing defining an L-shaped terminal cavity having a first cavity section in which the connection segment is disposed and a second cavity section arranged substantially perpendicularly to the first section in which the attachment segment is at partially disposed. The connection segment is movable from a pre-staged position in which the connection segment is electrically disconnected from the attachment segment to a fully staged position in which the connection segment is electrically connected to the attachment segment while attached to the connector housing.

18 Claims, 13 Drawing Sheets

ELECTRICAL CONNECTOR ASSEMBLY AND METHOD OF ASSEMBLING SAME

TECHNICAL FIELD

This application is directed to an electrical connector assembly having a two-piece electrical terminal and a method of assembling an electrical connector assembly having a two-piece electrical terminal.

BACKGROUND

Existing right-angled coaxial electrical connector designs may use a unitary coaxial terminal which, due to its right-angled L-shape, is difficult to insert into an insulative connector housing. In order to overcome this difficulty, the connector housing is split into two connector housing subassemblies. The unitary coaxial terminal is placed inside one of the connector housing subassemblies and is then joined to the other connector housing subassembly by laser welding to form the finished connector housing. This assembly process is complex, time consuming, and cost ineffective. Other existing right-angled coaxial electrical connector designs incorporate a cast terminal design that, while enabling them to provide a minimum of 110 newtons of pull force, is also a cost ineffective design.

SUMMARY

According to one or more aspects of the present disclosure, an electrical connector assembly includes an electrical terminal having an attachment segment connected to an electrical cable and a separate connection segment configured to mate with a corresponding mating terminal and a connector housing defining an L-shaped terminal cavity having a first cavity section in which the connection segment is disposed and a second cavity section arranged substantially perpendicularly to the first section in which the attachment segment is at partially disposed. The connection segment is movable from a pre-staged position in which the connection segment is electrically disconnected from the attachment segment to a fully staged position in which the connection segment is electrically connected to the attachment segment while attached to the connector housing.

According to one or more aspects of the present disclosure, a method of assembling an electrical connector includes the steps of:

a) providing an electrical terminal having an attachment segment connected to an electrical cable and a separate connection segment configured to mate with a corresponding mating terminal;
b) partially inserting the connection segment within a first cavity section of an L-shaped terminal cavity defined within a connector housing and placing it in a pre-staged position within the first cavity section;
c) inserting the attachment segment within a second cavity section of an L-shaped terminal cavity; and
d) moving the connection segment from the pre-staged position in which the connection segment is electrically disconnected from the attachment segment to a fully staged position in which the connection segment is electrically connected to the attachment segment.

BRIEF DESCRIPTION OF THE DRAWINGS

The present invention will now be described, by way of example with reference to the accompanying drawings, in which.

DETAILED DESCRIPTION

Figure 1:
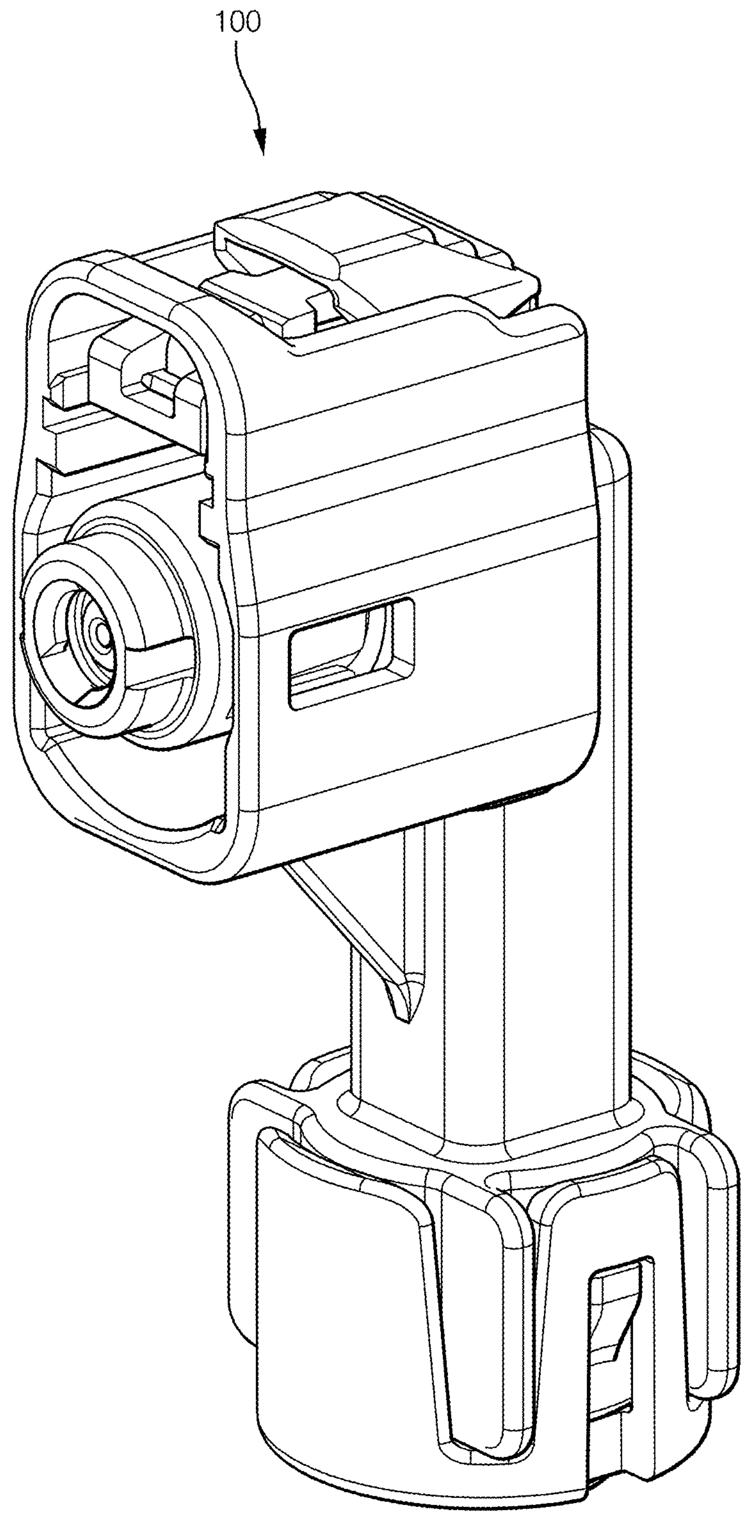
FIG. 1 illustrates an isometric view of an electrical connector assembly according to some embodiments.
Figure 2:
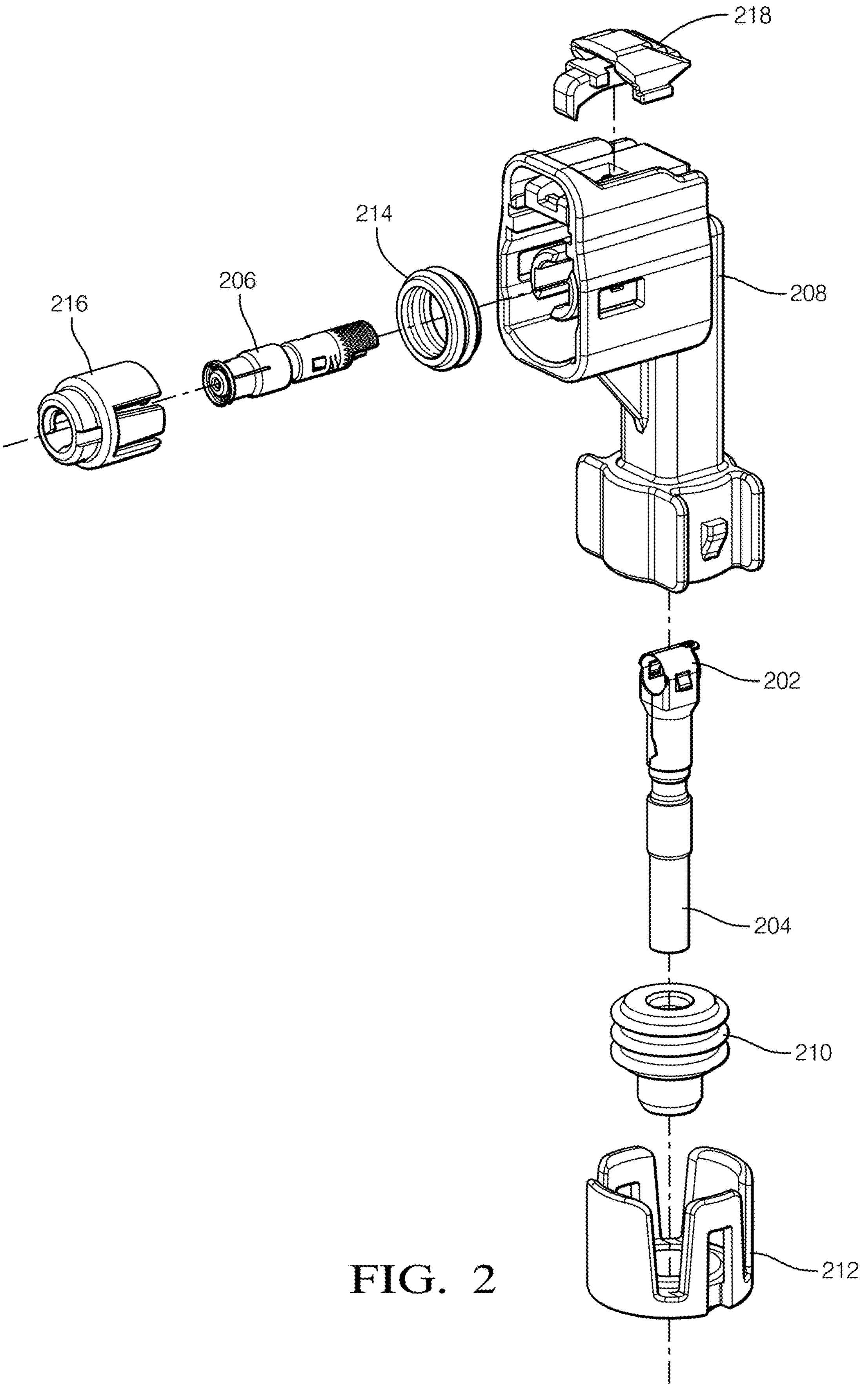
FIG. 2 illustrates an exploded isometric view of the electrical connector assembly of FIG. 1 according to some embodiments.

A non-limiting example of a right-angled electrical connector assembly, hereafter referred to as assembly 100, is illustrated in FIG. 1. As illustrated in FIG. 2, assembly 100 includes an electrical terminal having an attachment segment 202 connected to an electrical cable 204 and a separate connection segment 206 configured to mate with a corresponding mating terminal (not shown). The separation of attachment segment 202 from connection segment 206 provides the benefit of allowing a common attachment segment 202 to be used with different connection segment designs or configurations to accommodate different types of corresponding mating terminals. Assembly 100 also includes insulative connector housing 208 in which attachment segment 202 and connection segment 206 of the electrical terminal are disposed. Assembly 100 additionally includes resilient cable seal 210 that, when installed, is disposed between electrical cable 204 and connector housing 208 and cable seal retainer 212. Additionally, assembly 100 includes resilient connector seal 214 that, when installed in connector housing 208, surrounds connection segment 206 and nosepiece 216 in which connection segment 206 is disposed. Nosepiece 216 is slidably attached to connector housing 208 and is configured to move connection segment 206 from a pre-staged position to a fully staged position. Nosepiece 216 can also be removed from connector housing 208 in order to repair or replace connection segment 206, if needed. Nosepiece 216 is also configured to retain the resilient connector seal 214 within connector housing 208. Assembly 100 optionally includes connector position assurance device 218.

Figure 3A:
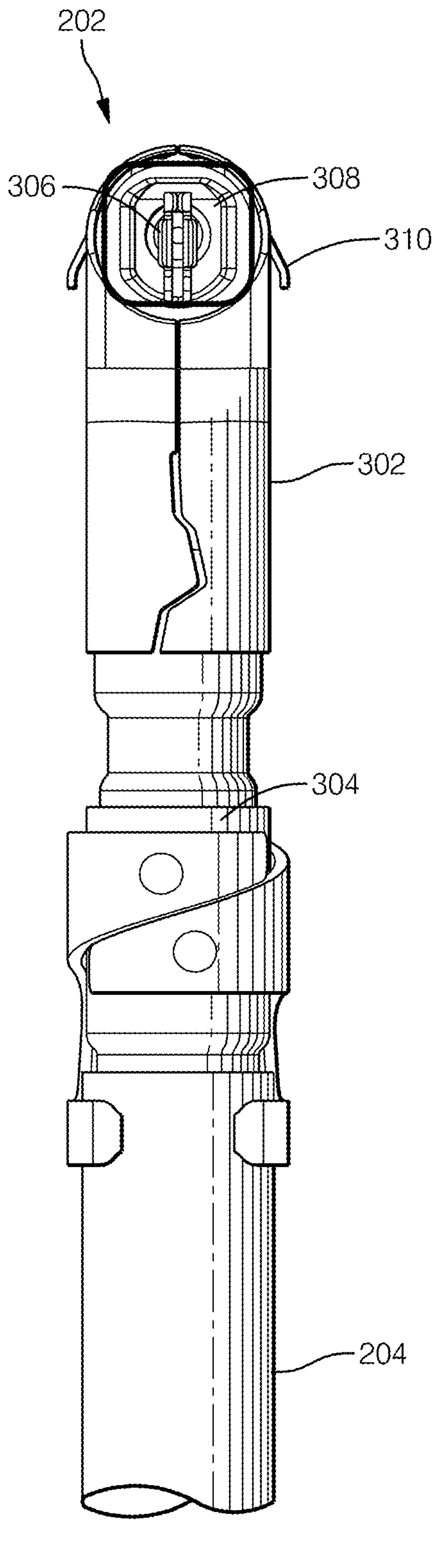
FIG. 3A illustrates a front view of an attachment segment of an electrical terminal in the electrical connector assembly of FIG. 1 according to some embodiments.
Figure 3B:
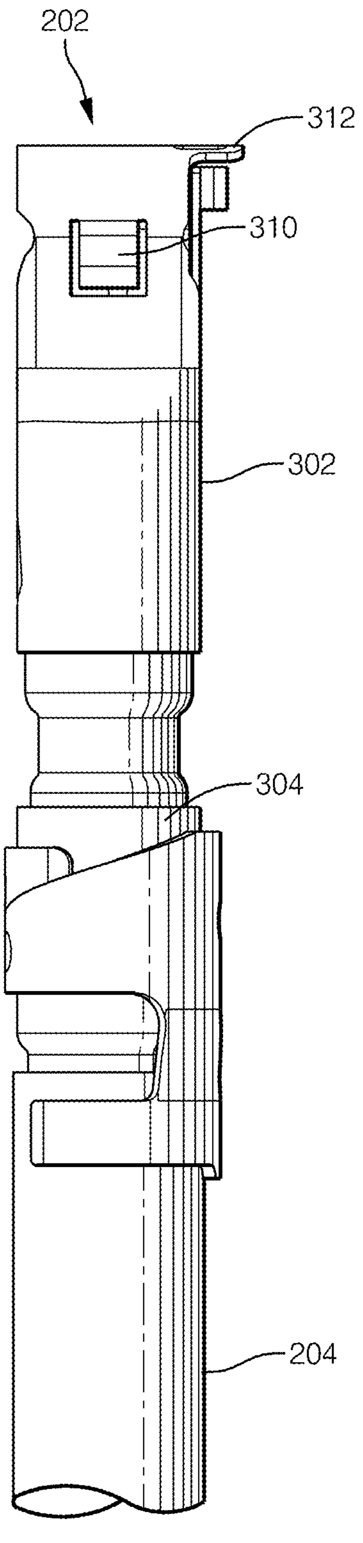
FIG. 3B illustrates a side view of the attachment segment of the electrical terminal of FIG. 3A according to some embodiments.

In this example, electrical cable 204 is a coaxial electrical cable 204 and the electrical connector is a coaxial electrical connector. As shown in FIGS. 3A and 3B, attachment segment 202 includes an attachment shield 302 attached to shield conductor 304 of coaxial electrical cable 204, an attachment terminal 306 that is attached to a central conductor of coaxial electrical cable 204, and attachment insulator 308 disposed intermediate attachment shield 302 and attachment terminal 306. Attachment shield 302 defines a pair of flexible locking tangs 310 and alignment tab 312.

Figure 4A:
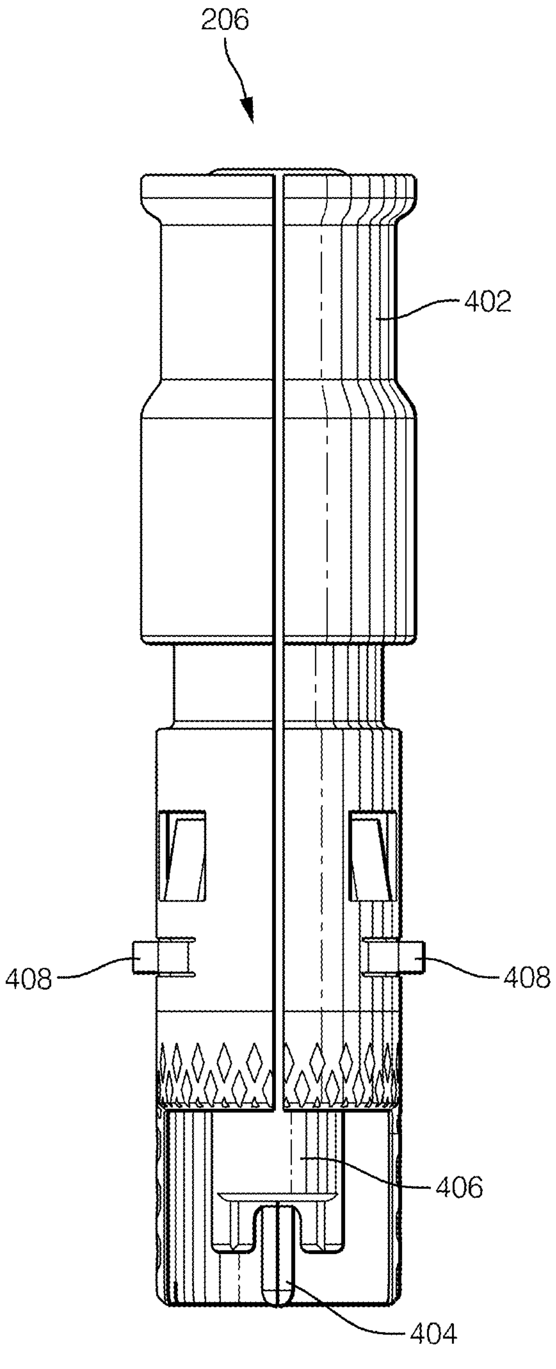
FIG. 4A illustrates a bottom view of a connection segment of the electrical terminal in the electrical connector assembly of FIG. 1 according to some embodiments.
Figure 4B:
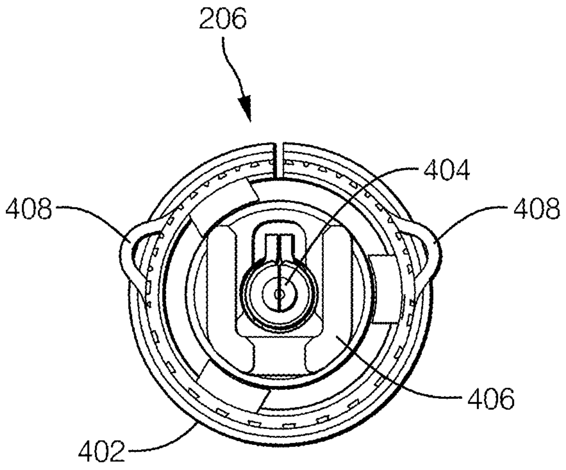
FIG. 4B illustrates an end view of the connection segment of the electrical terminal of FIG. 4A according to some embodiments.

As illustrated in FIGS. 4A and 4B, connection segment 206 includes connection shield 402, a connection terminal 404, and connection insulator 406 disposed intermediate connection shield 402 and connection terminal 404. Connection shield 402 also defines a pair of alignment features 408 protruding from connection shield 402.

Figure 5A:
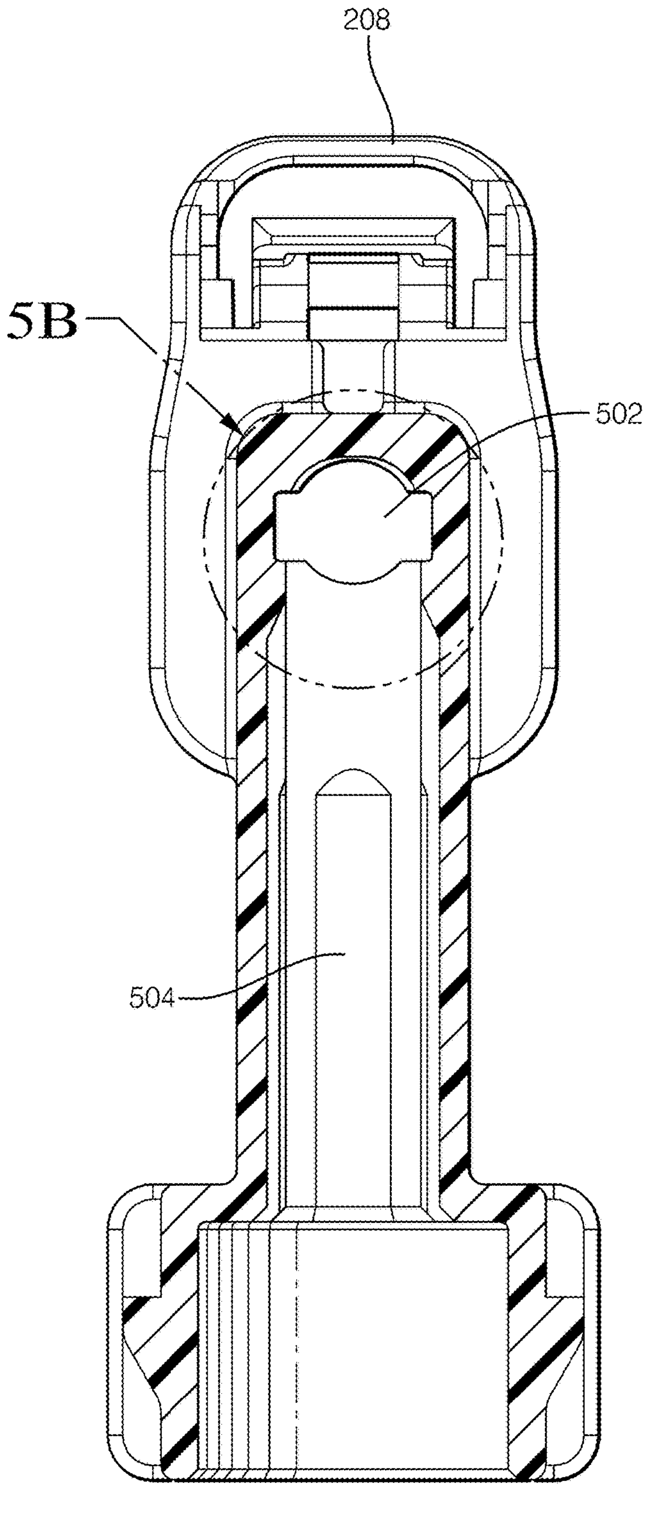
FIG. 5A illustrates a cross-section front view of a connector housing of the electrical connector assembly of FIG. 1 according to some embodiments.
Figure 5B:
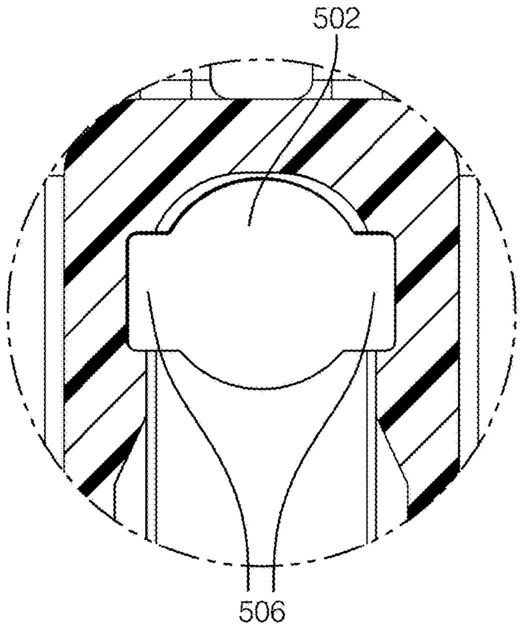
FIG. 5B illustrates a close-up cross-section front view of a terminal cavity in the connector housing of FIG. 5A according to some embodiments.

FIGS. 5A and 5B show a frontal cross-section view of connector housing 208 revealing a horizontal first terminal cavity section 502 in which connection segment 206 of the electrical terminal is disposed and vertical second terminal cavity section 504 in which attachment segment 202 and coaxial electrical cable 204 are disposed. FIG. 5B shows a pair of alignment grooves 506 defined within first terminal cavity section 502 in which alignment features 408 of connection segment 206 are received. These alignment grooves 506 cooperate with alignment features 408 to properly position connection segment 206 within first terminal cavity section 502.

Figure 6A:
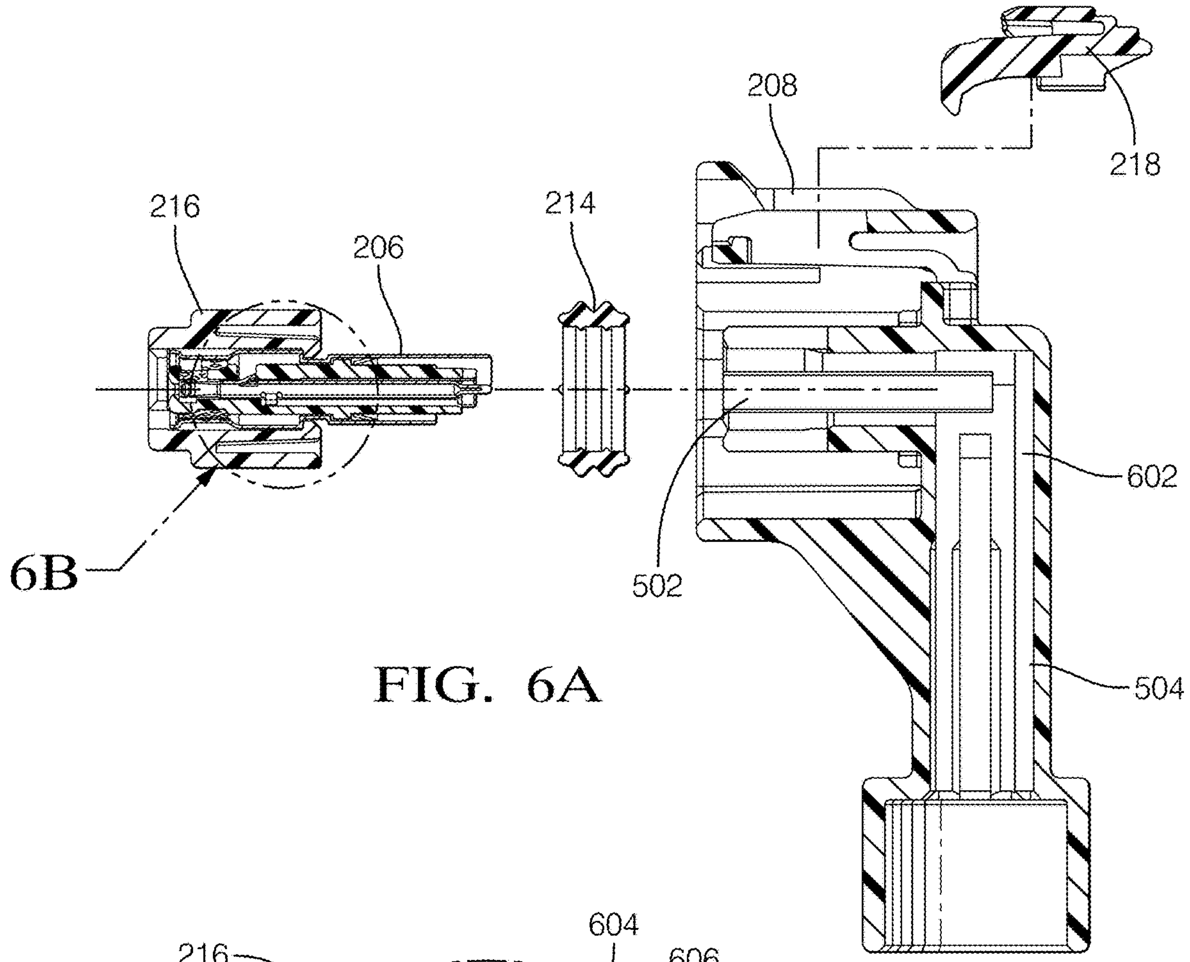
FIG. 6A illustrates a cross-section exploded side view of the electrical connector assembly of FIG. 1 according to some embodiments.
Figure 6B:
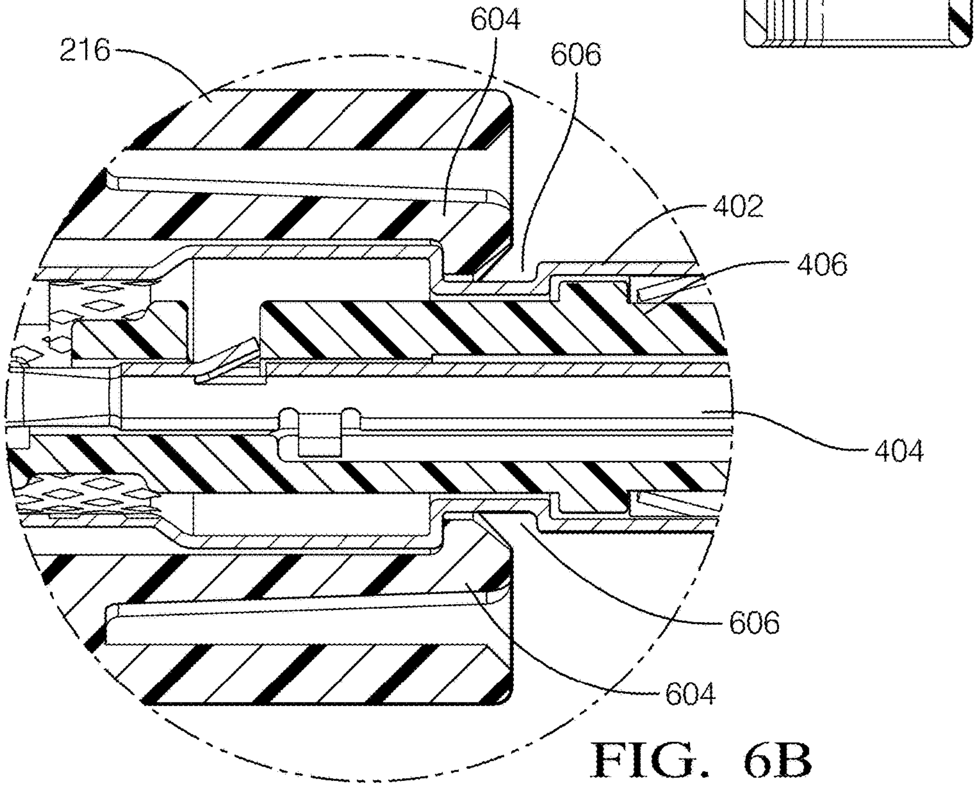
FIG. 6B illustrates a close-up cross-section side view of an interface between the connection segment of the electrical terminal and a nosepiece according to some embodiments.

FIG. 6A shows a side cross section view of nosepiece 216 attached to connection segment 206, with connection segment 206 and connector seal 214 in a pre-installed condition. FIG. 6A further shows the L-shape of first terminal cavity section 502 and second terminal cavity section 504 as well as an alignment slot 602 in which alignment tab 312 of attachment segment 202 is received. FIG. 6B is a close-up view of FIG. 6A showing nosepiece 216 attached to connection segment 206 by flexible arms 604 engaged with groove 606 on an outer surface of connection segment 206.

Figure 7A:
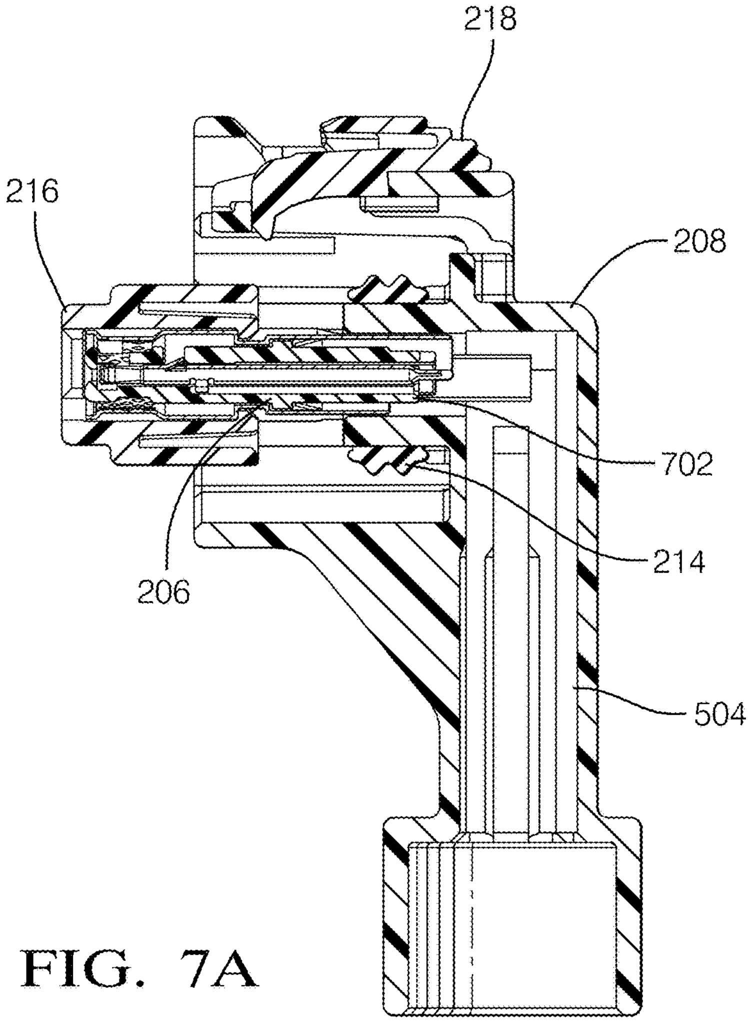
FIG. 7A illustrates a cross-section exploded side view of the electrical connector assembly of FIG. 1 with the connection segment of the electrical terminal and the nosepiece in a pre-staged position according to some embodiments.
Figure 7B:
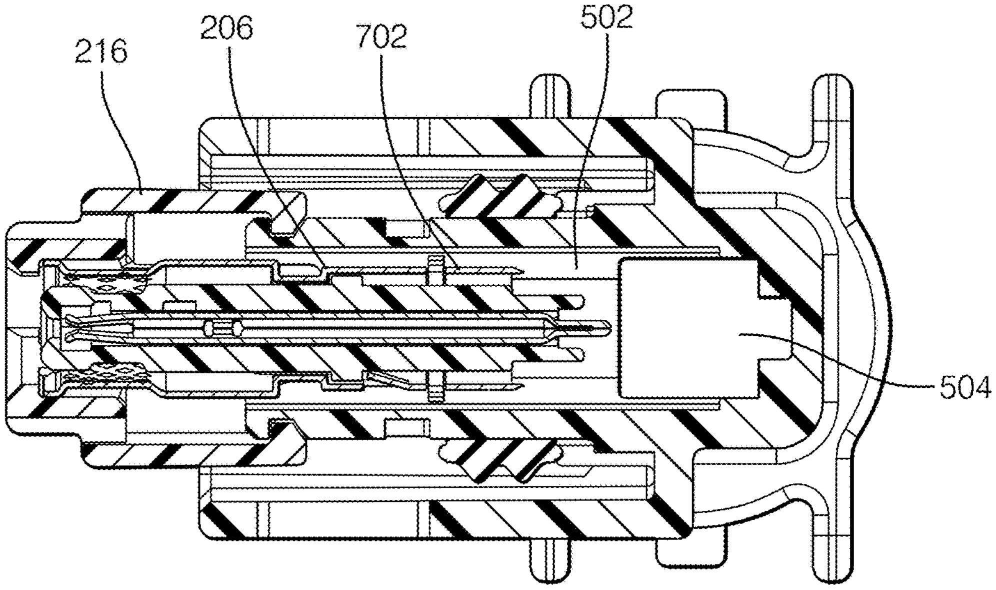
FIG. 7B illustrates a close-up cross-section top view an interface between the connection segment of the electrical terminal and the nosepiece with the connector housing according to some embodiments.

FIGS. 7A and 7B show nosepiece 216 and connection segment 206 in pre-staged position 702 in first terminal cavity section 502. As can be seen in FIGS. 7A and 7B, connection segment 206 is clear from second terminal cavity section 504 and does not block insertion of attachment segment 202 from being fully inserted within second terminal cavity section 504.

Figure 8A:
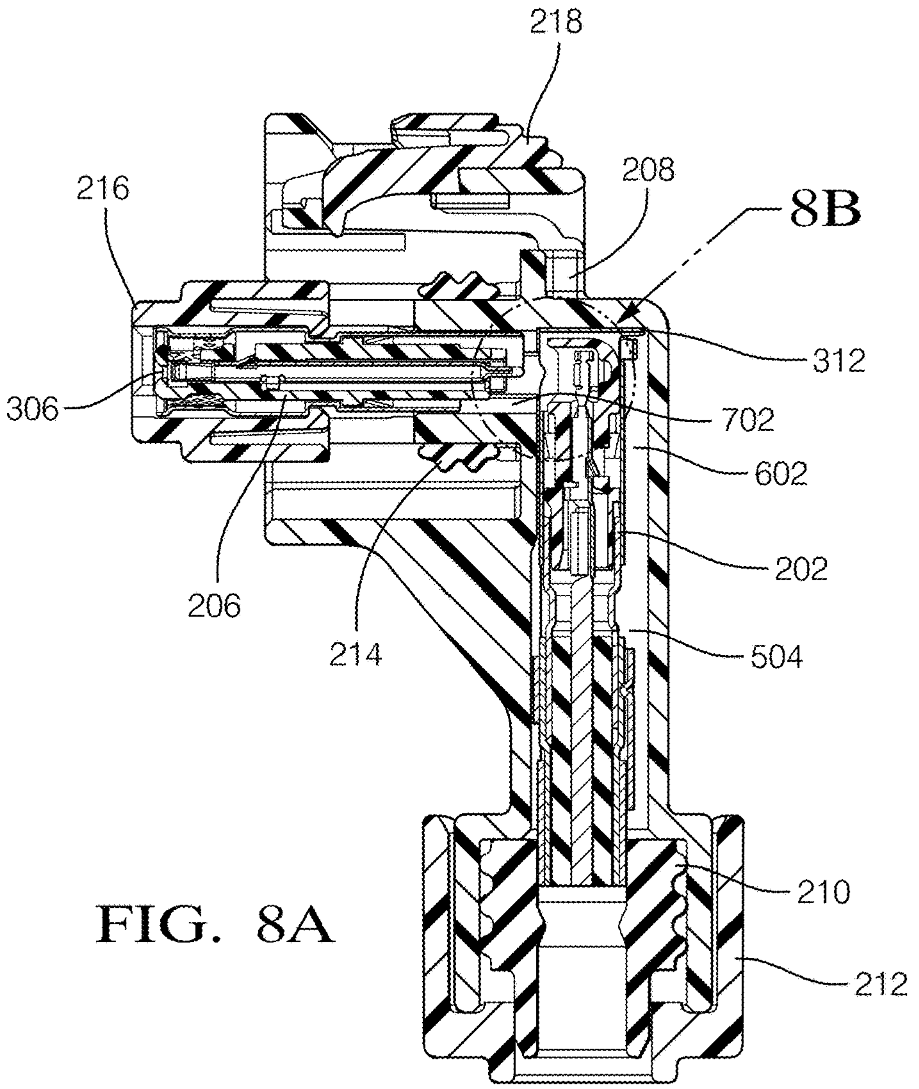
FIG. 8A illustrates a cross-section side view of the electrical connector assembly of FIG. 1 with the connection segment of the electrical terminal and the nosepiece in a pre-staged position and the attachment segment of the electrical terminal in a fully staged position according to some embodiments.
Figure 8B:
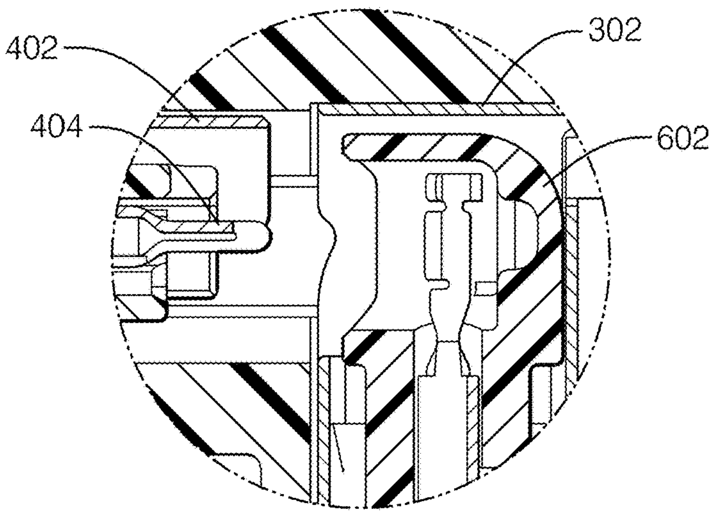
FIG. 8B illustrates a close-up cross-section side view of FIG. 8A showing a location of an end of the connection segment relative to an end of the attachment segment according to some embodiments.

The cross-section side views of FIGS. 8A and 8B show attachment segment 202 fully inserted within second terminal cavity section 504 while nosepiece 216 and connection segment 206 remain in pre-staged position 702 in first terminal cavity section 502. With connection segment 206 in pre-staged position 702, attachment segment 202 and connection segment 206 are electrically disconnected from one another. FIG. 8A further illustrates alignment tab 312 disposed within alignment slot 602. Alignment tab 312 and alignment slot 602 cooperate to position the attachment segment 202 within second terminal cavity section 504 in a location to receive connection segment 206. As best shown in FIG. 8B, attachment shield 302 is separated from connection shield 402 and attachment terminal 306 is separated from connection terminal 404 when connection segment 206 is in pre-staged position 702.

Figure 9A:
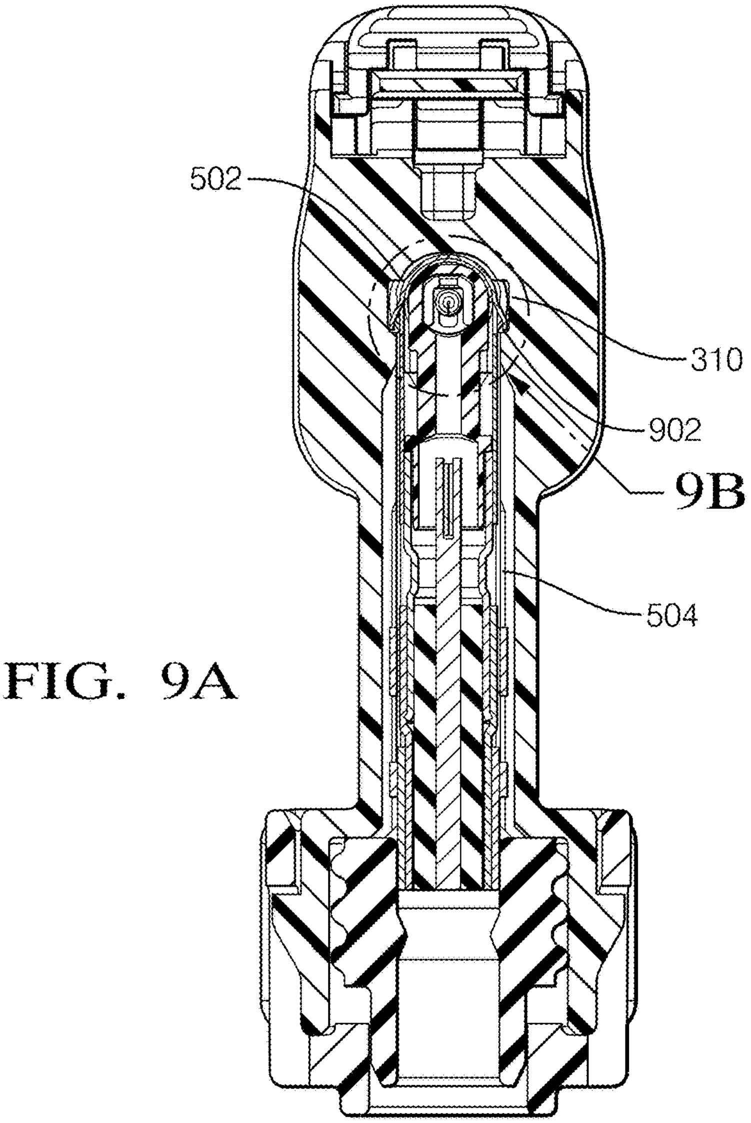
FIG. 9A illustrates a cross-section front view of the electrical connector assembly of FIG. 1 according to some embodiments.
Figure 9B:
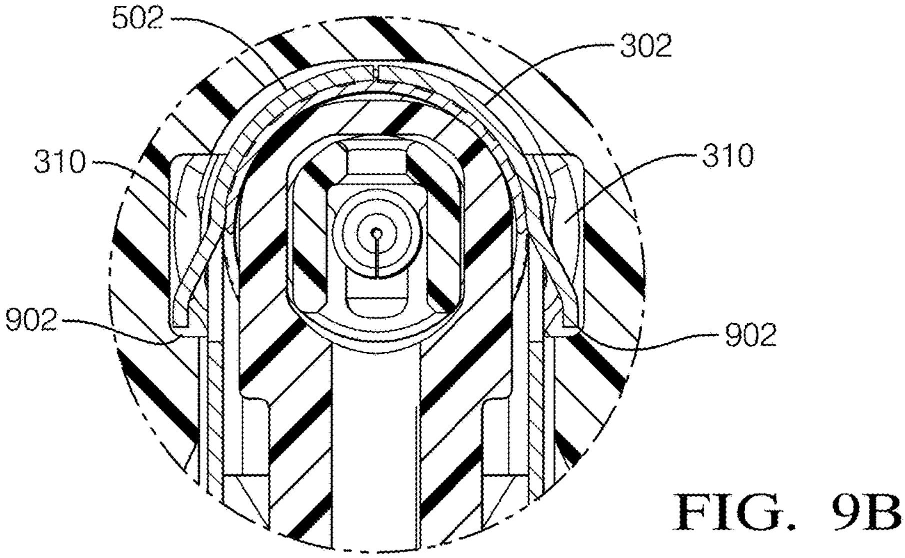
FIG. 9B illustrates a close up cross-section front view of FIG. 9A showing locking features of the attachment portion engaging the connector housing according to some embodiments.

FIGS. 9A and 9B illustrate frontal cross section views of attachment segment 202 fully inserted within second terminal cavity section 504 of connector housing 208. As best shown in FIG. 9B, Attachment shield 302 defines a pair of flexible locking tangs 310 that engage ledge 902 defined in the second terminal cavity section 504 and retain the attachment segment 202 within the second terminal cavity section 504.

Figure 10A:
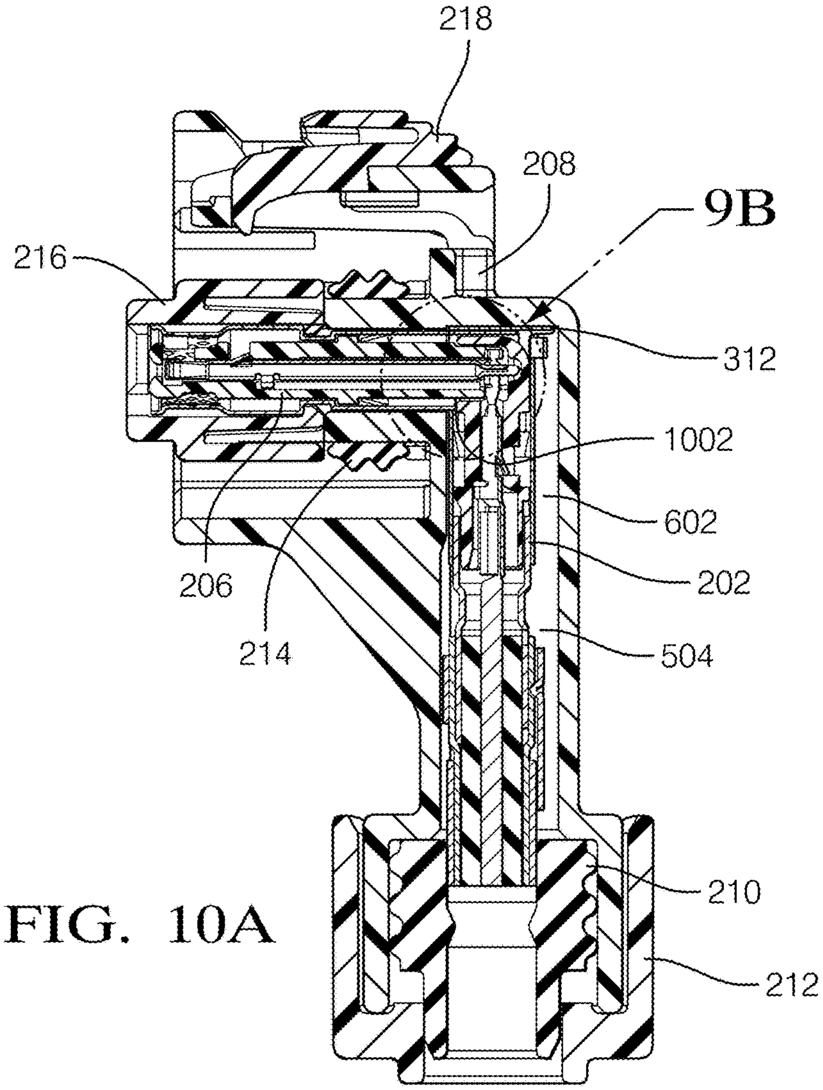
FIG. 10A illustrates a cross-section side view of the electrical connector assembly of FIG. 1 with the connection segment of the electrical terminal and the nosepiece in a fully staged position and engaged with the attachment segment of the electrical terminal according to some embodiments.
Figure 10B:
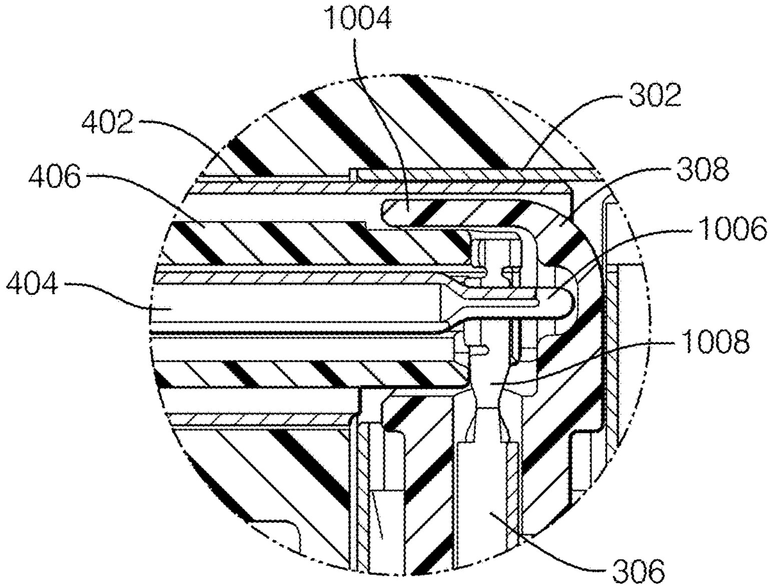
FIG. 10B illustrates a close-up cross-section side view of FIG. 10A showing the engagement of the end of connection segment with the end of the attachment segment according to some embodiments.
Figure 11A:
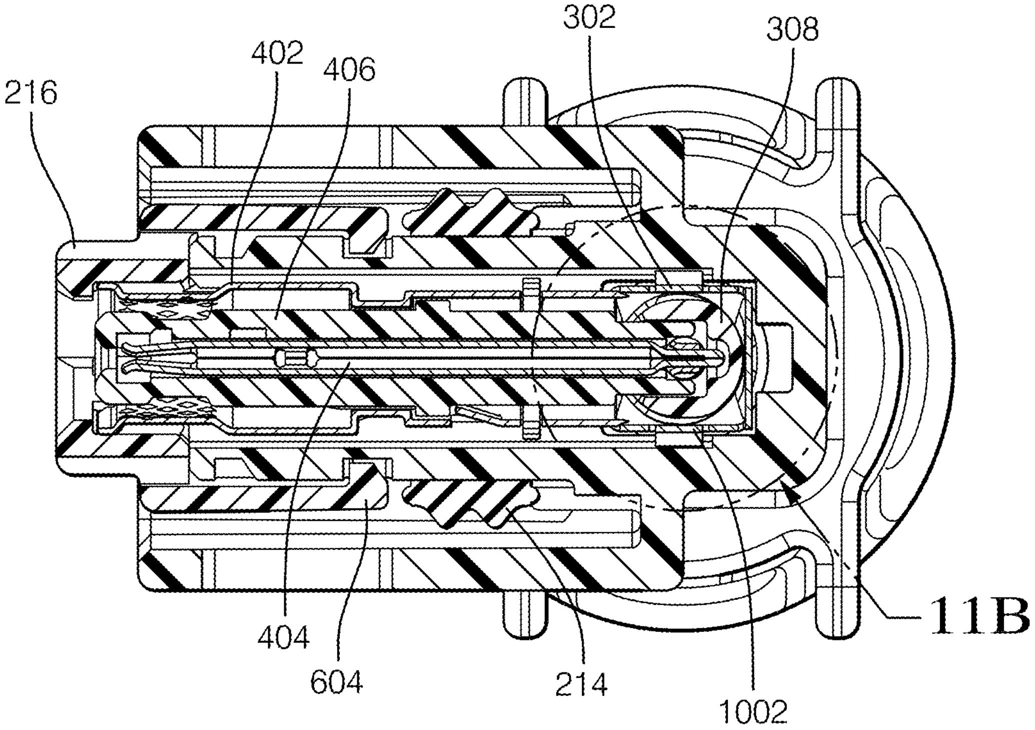
FIG. 11A illustrates a cross-section top view of the electrical connector assembly of FIG. 1 with the connection segment of the electrical terminal and the nosepiece in the fully staged position and engaged with the attachment segment of the electrical terminal according to some embodiments.
Figure 11B:
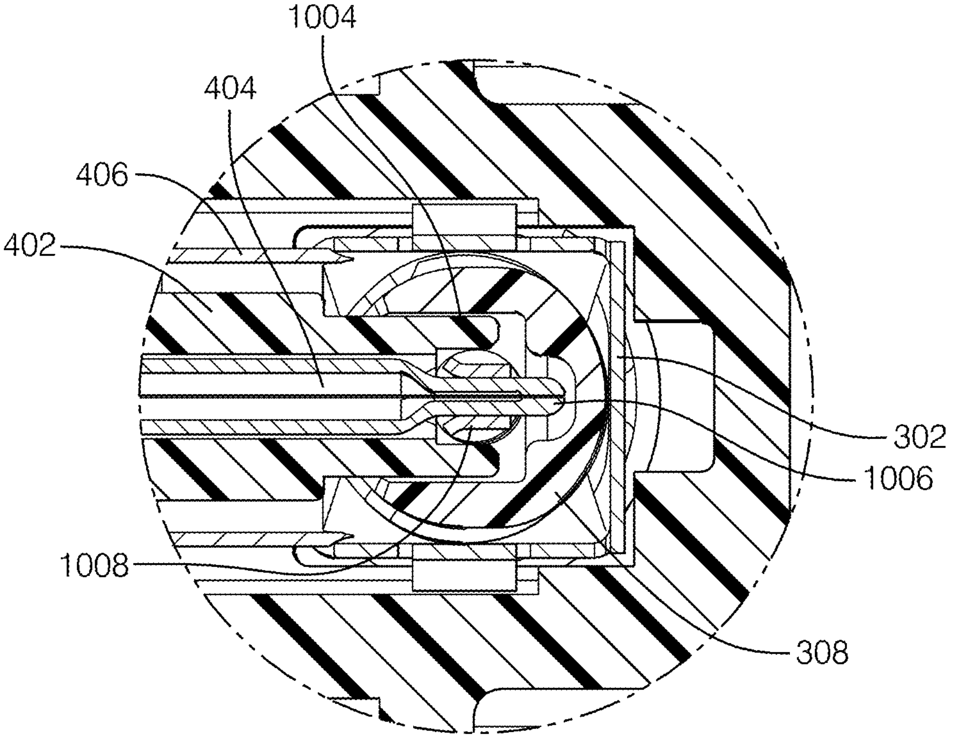
FIG. 11B illustrates a close-up cross-section top view of FIG. 11A showing the engagement of the end of connection segment with the end of the attachment segment according to some embodiments.

FIGS. 10A and 10B show cross-section side views and FIGS. 11A and 11B show cross-section top views in which attachment segment 202 engages connection segment 206. With connection segment 206 in fully staged position 1002, attachment segment 202 and connection segment 206 are electrically connected to one another. A portion of connection insulator 406 is received within cavity 1004 defined by attachment insulator 308 when connection segment 206 is in the fully staged position 1002. This engagement between connection insulator 406 and attachment insulator 308 increases the pull out force needed to remove the attachment segment 202 from second terminal cavity section 504. In addition, connection shield 402 is partially disposed within attachment shield 302 and pin 1006 of connection terminal 404 is received within socket 1008 of attachment terminal 306 when the connection segment 206 is in the fully staged position 1002.

Figure 12:
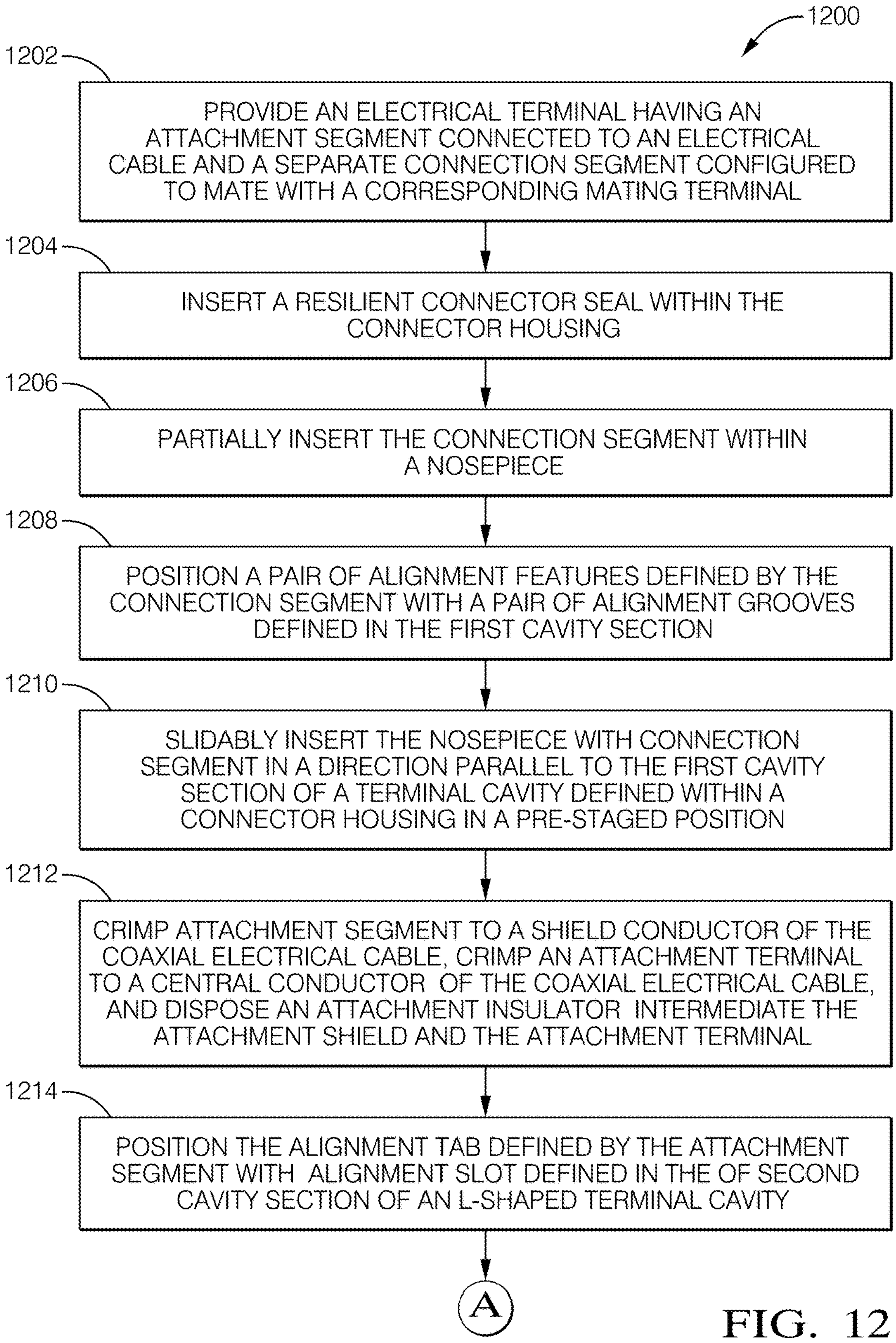
FIG. 12 illustrates a flow chart for a method of assembling the electrical connector assembly of FIG. 1 according to some embodiments.
Figure 12:
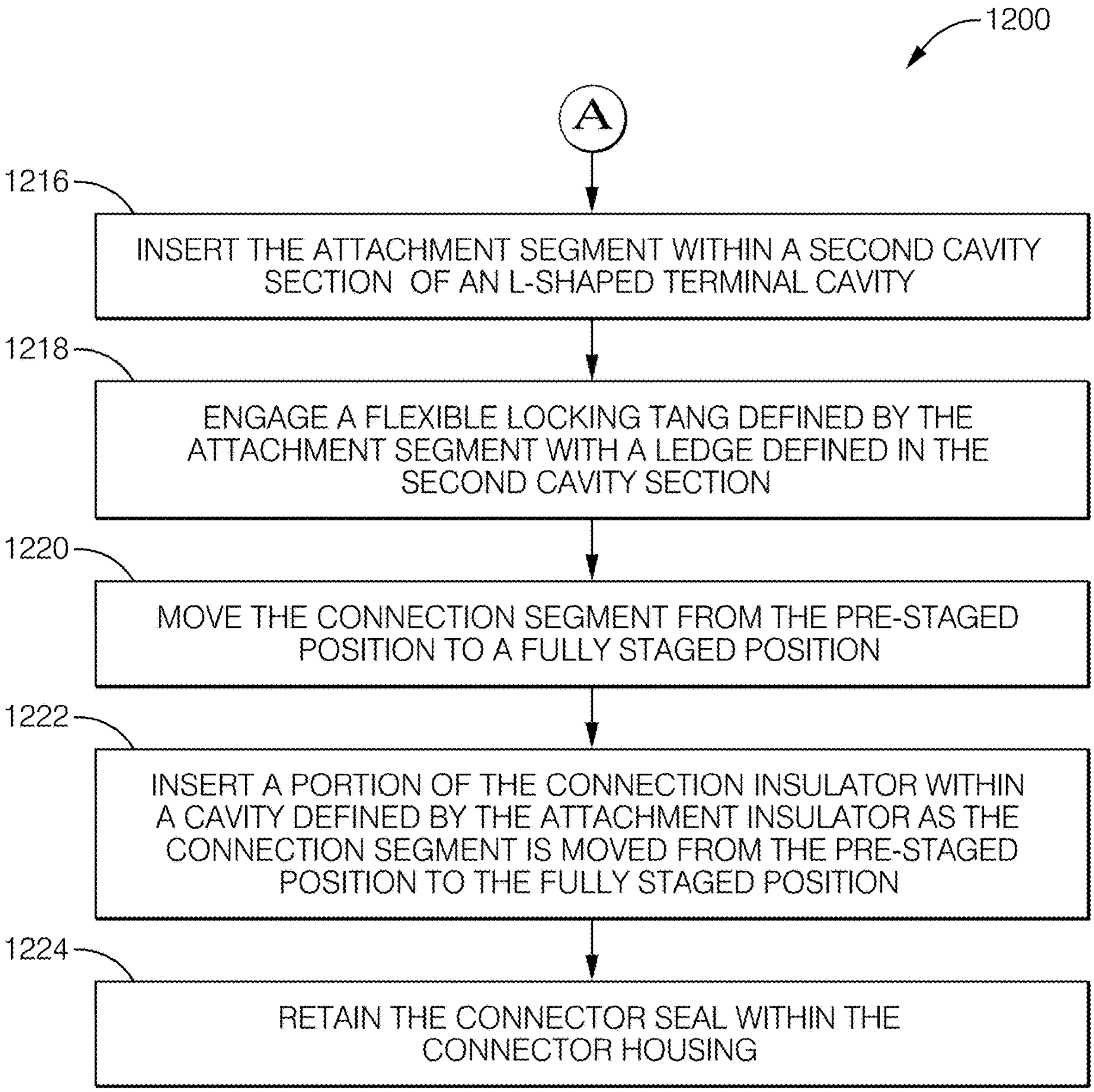

FIG. 12 shows a flow chart of method 1200 of assembling an electrical connector, such as the electrical connector assembly 100 described above and illustrated in FIGS. 1-11B.

STEP 1202, PROVIDE AN ELECTRICAL TERMINAL HAVING AN ATTACHMENT SEGMENT CONNECTED TO AN ELECTRICAL CABLE AND A SEPARATE CONNECTION SEGMENT CONFIGURED TO MATE WITH A CORRESPONDING MATING TERMINAL, includes providing an electrical terminal having attachment segment 202 connected to electrical cable 204 and separate connection segment 206 configured to mate with a corresponding mating terminal (not shown);

STEP 1204, INSERT A RESILIENT CONNECTOR SEAL WITHIN THE CONNECTOR HOUSING, includes inserting a resilient connector seal 214 within the connector housing 208 such that connector seal 214 surrounds connection segment 206;

STEP 1206, PARTIALLY INSERT THE CONNECTION SEGMENT WITHIN A NOSEPIECE, includes partially inserting connection segment 206 within nosepiece 216;

STEP 1208, POSITION A PAIR OF ALIGNMENT FEATURES DEFINED BY THE CONNECTION SEGMENT WITH A PAIR OF ALIGNMENT GROOVES DEFINED IN THE FIRST CAVITY SECTION, includes positioning a pair of alignment features 408 defined by connection segment 206 with a pair of alignment grooves 506 defined in first terminal cavity section 502;

STEP 1210, SLIDABLY INSERT THE NOSEPIECE WITH CONNECTION SEGMENT IN A DIRECTION PARALLEL TO THE FIRST CAVITY SECTION OF A TERMINAL CAVITY DEFINED WITHIN A CONNECTOR HOUSING in a PRE-STAGED POSITION, includes slidably inserting nosepiece 216 with connection segment 206 in a direction parallel to first terminal cavity section 502 of a terminal cavity defined within connector housing 208 in pre-staged position 702;

Electrical cable 204 may be a coaxial electrical cable 204 and the electrical connector assembly 100 may be a coaxial electrical connector assembly 100. In this case, STEP 1212, CRIMP ATTACHMENT SHIELD TO A SHIELD CONDUCTOR OF THE COAXIAL ELECTRICAL CABLE, CRIMP AN ATTACHMENT TERMINAL TO A CENTRAL CONDUCTOR OF THE COAXIAL ELECTRICAL CABLE, AND DISPOSE AN ATTACHMENT INSULATOR INTERMEDIATE THE ATTACHMENT SHIELD AND THE ATTACHMENT TERMINAL, includes crimping attachment shield 302 to shield conductor 304 of the coaxial electrical cable 204, crimping attachment terminal 306 to central conductor of the coaxial electrical cable 204, and disposing attachment insulator 308 intermediate attachment shield 302 and attachment terminal 306;

STEP 1214 POSITION THE ALIGNMENT TAB DEFINED BY THE ATTACHMENT SEGMENT WITH ALIGNMENT SLOT DEFINED IN THE OF SECOND CAVITY SECTION OF AN L-SHAPED TERMINAL CAVITY, includes positioning the alignment tab 312 defined by attachment segment 202 with alignment slot 602 defined in the of second terminal cavity section 504 of the L-shaped terminal cavity. This ensures proper alignment of connection segment 206 and attachment segment 202;

STEP 1216 INSERT THE ATTACHMENT SEGMENT WITHIN A SECOND CAVITY SECTION OF AN L-SHAPED TERMINAL CAVITY, includes inserting attachment segment 202 within second terminal cavity section 504 of the L-shaped terminal cavity;

STEP 1218, ENGAGE A FLEXIBLE LOCKING TANG DEFINED BY THE ATTACHMENT SEGMENT WITH A LEDGE DEFINED IN THE SECOND CAVITY SECTION, includes engaging flexible locking tang 310 defined by the attachment segment 202 with a ledge 902 defined in the second terminal cavity section 504, thereby retaining the attachment segment 202 within the second terminal cavity section 504;

STEP 1220, MOVE THE NOSE PIECE WITH CONNECTION SEGMENT FROM THE PRE-STAGED POSITION TO A FULLY STAGED POSITION, includes moving the nose piece 216 with connection segment 206 from the pre-staged position 702 to a fully staged position 1002;

STEP 1222, INSERT A PORTION OF THE CONNECTION INSULATOR WITHIN A CAVITY DEFINED BY THE ATTACHMENT INSULATOR AS THE CONNECTION SEGMENT IS MOVED FROM THE PRE-STAGED POSITION TO THE FULLY STAGED POSITION, includes inserting a portion of connection insulator within a cavity defined by attachment insulator as connection segment is moved from pre-staged position 702 to fully staged position 1002; and STEP 1224, RETAIN THE CONNECTOR SEAL WITHIN THE CONNECTOR HOUSING, includes retaining connector seal 214 within connector housing 208 using nosepiece 216.

STEPS 1202 to 1210 are steps in a process of manufacturing assembly 100. STEPS 1212 to 1224 are steps in a process of integrating assembly 100 with electrical cable 204.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

an electrical terminal having an attachment segment connected to an electrical cable and a separate connection segment configured to mate with a corresponding mating terminal; and a connector housing defining an L-shaped terminal cavity having a first cavity section in which the connection segment is disposed and a second cavity section arranged substantially perpendicularly to the first section in which the attachment segment is at least partially disposed, the attachment segment defines an alignment tab configured to engage an alignment slot defined in the second cavity section, the alignment tab and alignment slot cooperate to position the attachment segment within the second cavity section in a location to receive the connection segment, and the connection segment being movable from a pre-staged position in which the connection segment is electrically disconnected from the attachment segment to a fully staged position in which the connection segment is electrically connected to the attachment segment while attached to the connector housing.

2. The electrical connector assembly in accordance with claim 1, wherein the attachment segment includes an attachment shield attached to a shield conductor of the electrical cable, an attachment terminal attached to a central conductor of the electrical cable, and an attachment insulator disposed intermediate the attachment shield and the attachment terminal, wherein the connection segment includes a connection shield, a connection terminal, and a connection insulator disposed intermediate the connection shield and the connection terminal, and wherein a portion of the connection insulator is received within a cavity defined by the attachment insulator when the connection segment is in the fully staged position.

3. The electrical connector assembly in accordance with claim 2, wherein the attachment shield is separated from the connection shield when the connection segment is in the pre-staged position and wherein a portion of the connection shield is received within a portion of the attachment shield when the connection segment is in the fully staged position.

4. The electrical connector assembly in accordance with claim 2, wherein the attachment terminal is separated from the connection terminal when the connection segment is in the pre-staged position and wherein a pin of the connection terminal is received within a socket of the attachment terminal when the connection segment is in the fully staged position.

5. The electrical connector assembly in accordance with claim 1, further comprising:

a nosepiece in which the connection segment is partially disposed, wherein the nosepiece is slidably attached to the connector housing and is configured to move the connection segment from the pre-staged position to the fully staged position.

6. The electrical connector assembly in accordance with claim 5, further comprising:

a resilient connector seal disposed within the connector housing and surrounding the connection segment, wherein the nosepiece is configured to retain the connector seal within the connector housing.

7. The electrical connector assembly in accordance with claim 1, wherein the attachment segment defines a flexible locking tang configured to engage a ledge defined in the second cavity section and retain the attachment segment within the second cavity section.

8. The electrical connector assembly in accordance with claim 1, wherein the connection segment defines a pair of alignment features configured to engage a pair of alignment grooves defined within the first cavity section and wherein the pair of alignment features and the pair of alignment grooves cooperate to position the connection segment within the first cavity section in a location to receive the attachment segment.

9. A method of assembling an electrical connector, comprising:

a) providing an electrical terminal having an attachment segment connected to an electrical cable and a separate connection segment configured to mate with a corresponding mating terminal;

b) partially inserting the connection segment within a first cavity section of an L-shaped terminal cavity defined within a connector housing and placing it in a pre-staged position within the first cavity section;

c) inserting the attachment segment within a second cavity section of an L-shaped terminal cavity;

d) engaging an alignment tab defined by the attachment segment within an alignment slot defined in the second cavity section; and e) positioning the attachment segment within the second cavity section in a location to receive the connection segment via cooperation of the alignment tab and alignment slot: and f) moving the connection segment from the pre-staged position in which the connection segment is electrically disconnected from the attachment segment to a fully staged position in which the connection segment is electrically connected to the attachment segment.

10. The method in accordance with claim 9, wherein steps a) through f) are performed in the order listed.

11. The method in accordance with claim 9, wherein the attachment segment includes an attachment shield attached to a shield conductor of the electrical cable, an attachment terminal attached to a central conductor of the electrical cable, and an attachment insulator disposed intermediate the attachment shield and the attachment terminal, wherein the connection segment includes a connection shield, a connection terminal, and a connection insulator disposed intermediate the connection shield and the connection terminal, and wherein the method further comprises:

g) inserting a portion of the connection insulator within a cavity defined by the attachment insulator as the connection segment is moved from the pre-staged position to the fully staged position.

12. The method in accordance with claim 11, wherein the attachment shield is separated from the connection shield when the connection segment is in the pre-staged position and wherein a portion of the connection shield is received within a portion of the attachment shield when the connection segment is in the fully staged position.

13. The method in accordance with claim 11, wherein the attachment terminal is separated from the connection terminal when the connection segment is in the pre-staged position and wherein a pin of the connection terminal is received within a socket of the attachment terminal when the connection segment is in the fully staged position.

14. The method in accordance with claim 11, wherein the attachment shield is separated from the connection shield when the connection segment is in the pre-staged position and wherein a portion of the connection shield is received within a portion of the attachment shield when the connection segment is in the fully staged position.

15. The method in accordance with claim 9, further comprising:

h) partially inserting the connection segment within a nosepiece;

i) slidably attaching nosepiece to the connector housing; and j) sliding the nosepiece in a direction parallel to the first cavity section, wherein steps h) and i) are performed prior to step f) and step j) is performed concurrently with step f).

16. The method in accordance with claim 15, further comprising:

k) inserting a resilient connector seal within the connector housing such that the connector seal surrounds the connection segment; and l) retaining the connector seal within the connector housing using the nosepiece.

17. The method in accordance with claim 9, further comprising:

m) engaging a flexible locking tang defined by the attachment segment with a ledge defined in the second cavity section, thereby retaining the attachment segment within the second cavity section.

18. The method in accordance with claim 9, further comprising:

n) engaging a pair of alignment features defined by the connection segment with a pair or alignment grooves defined in the first cavity section; and o) positioning the connection segment within the first cavity section in a location to be received by the attachment segment via cooperation of the pair of alignment features and the pair of alignment grooves.

* * * * *